United States Patent [19]

Murphy et al.

[11] Patent Number: 4,682,093
[45] Date of Patent: Jul. 21, 1987

[54] POWER SUPPLY SYSTEMS FOR INDUCTIVE ELEMENTS

[75] Inventors: John Murphy, Bishopstown; Francis McMullin, Clare; Michael Egan, Wilton; John V. Byrne, Dublin; Patrick Kenneally, Clare, all of Ireland

[73] Assignee: Kollmorgen Technologies Corporation, Dallas, Tex.

[21] Appl. No.: 789,036

[22] Filed: Oct. 18, 1985

[30] Foreign Application Priority Data

Oct. 19, 1984 [IE] Ireland .................................. 2700/84
Apr. 16, 1985 [IE] Ireland .................................. 959/85

[51] Int. Cl.$^4$ ............................................. H02P 7/36
[52] U.S. Cl. ........................................ 318/701; 363/20
[58] Field of Search ................... 318/701; 363/16, 20, 363/60, 61, 124

[56] References Cited

U.S. PATENT DOCUMENTS

| 3,953,785 | 4/1976 | Bell ....................................... 363/124 |
| 4,155,112 | 5/1979 | Miller et al. ........................... 363/97 |
| 4,163,278 | 7/1979 | Onoue et al. ......................... 363/97 |
| 4,455,596 | 6/1984 | Baker ..................................... 363/21 |
| 4,556,827 | 12/1985 | Erdman .............................. 363/124 |

FOREIGN PATENT DOCUMENTS

| 0102471 | 3/1984 | European Pat. Off. . |
| 1035986 | 7/1966 | United Kingdom . |
| 1519904 | 9/1976 | United Kingdom . |
| 2006552 | 5/1979 | United Kingdom . |
| 2016226 | 9/1979 | United Kingdom . |
| 1554835 | 10/1979 | United Kingdom . |
| 2020505 | 11/1979 | United Kingdom . |
| 2022345 | 12/1979 | United Kingdom . |
| 2026260 | 1/1980 | United Kingdom . |
| 2080639 | 2/1982 | United Kingdom . |
| 2090078 | 6/1982 | United Kingdom . |
| 2090487 | 7/1982 | United Kingdom . |
| 2094076 | 9/1982 | United Kingdom . |
| 2102639 | 2/1983 | United Kingdom . |
| 2104737 | 3/1983 | United Kingdom . |

OTHER PUBLICATIONS

2410/80–Irish Application (Jeumont-Schneider).
Advances in Switched Mode Power Conversion–Middlebrook and Cuk; Tesla 1983, vols. 1, 2 and 3, contents and forewords.
Principles of Inverter Circuits; Bedord & Hoft; Wiley, pp. 336–339.
IEEE/IAS Annual Conference, Toronto, Oct. 1985; Bass et al.: Development of a Unipolar Converter for Variable Reluctance Motor Drive.
IEEE/IAS Annual Conference, Toronto, Oct. 1985; Harris et al.; A Review of the Integral Horsepower Switched Reluctance Drive.
Unitrode Switching Regulated Power Supply Design Seminar Manual, Unitrode Corporation, 1985; L. H. Dixon, Jr.: Switching Power Supply Topology Review.

*Primary Examiner*—Patrick R. Salce
*Assistant Examiner*—Jeffrey Sterrett
*Attorney, Agent, or Firm*—Morgan & Finnegan

[57] ABSTRACT

In a power supply system, an inductance L is connected between a rail at a voltage $V_1$ and a rail at earth through a switch S. When the switch is opened, a current $i_2$ flowing from the inductance L is directed to a third rail through a diode D, voltage on the third rail rising to $V_2$. The system may function as a dc to dc converter with an output voltage between the $V_1$ rail and $V_2$ rail equal to $V_2-V_1$. The system may alternatively be used in, for example, a reluctance motor drive, in which case a further inductance with associated switch and diode is included in the circuit in inverse configuration to prevent excessive voltage rise on the third rail.

4 Claims, 10 Drawing Figures

POWER SUPPLY SYSTEMS FOR INDUCTIVE ELEMENTS

BACKGROUND OF THE INVENTION

1. Field of the Invention.

This invention relates to power supply systems for feeding inductive elements and in particular to power supply systems for feeding switched inductive windings such as the phase windings of a switched variable reluctance motor. A motor of this kind, to which the present invention may be applied, is disclosed in our co-pending Patent Application Ser. No. 798,038 entitled "Variable Speed Variable Reluctance Electrical Machines".

The invention also relates to power systems in general, and in particular to certain configurations of power systems serving as dc (direct current) to dc converters.

2. Description of the Prior Art.

In a variable reluctance motor provided with a unipolar drive, current may be switched into the phase windings by electronic devices under PWM control. In considering the electrical behaviour of the power supply circuit for the phase windings, the windings may be regarded as inductors under certain operating conditions, in that their response to current flowing through them under such circumstances is largely determined by their inductance rather than by their resistance. When the switch for a particular winding is closed, current flows through the inductor in question, which may then be connected between a supply rail and ground. Energy is thus stored in the magnetic field of the winding, the amount of this energy being $\frac{1}{2}i^2L$, where i is the current and L is the inductance of the winding. When the switch opens again, this energy stored in the magnetic field has either to be dissipated or, preferably, returned regeneratively to the supply. In a particular supply arrangement for reluctance motors, the switched end of the winding is also connected to a second supply rail through a normally reverse biassed diode. Thus in this arrangement, winding current transfers to the diode after the switch has opened and decays if the second supply rail has the appropriate polarity. However it is frequently the case that such supply rails are unable to regenerate energy, with the possible result that the voltage of the second supply rail may rise to a destructive level unless an equal or greater current is drawn from it than that being supplied by the phase winding. Dealing with or disposing of this inductively stored energy is thus a considerable problem in the application of variable reluctance motors, especially in situations where they are required to operate at low rotational speeds.

A twin-rail power supply with an equal number of motor phases connected to the positive and negative rails may be adequate for reluctance motors operating in a continuously-rotating motoring mode only, with non-usable inductively stored winding energy being returned to the complementary rail for use in the phases connected thereto, but this is not necessarily the case in a motor required to provide torque at zero speed in order to hold a load, where the current of the driving phases, less losses, may be transferred continuously between the rails and may pump up a supply capacitor located, for example, between the second rail and earth. At certain rotor positions the effects of two phases will cancel, and between these points, peaks of upward and downward current transfer will be reached. Thus, the effect at zero speed is to unbalance the rails. On the other hand, in a reluctance motor rotating at speed and acting to decelerate an inertial load or otherwise regenerate energy, the effect will be to pump up both supplies.

This second-mentioned effect is the same as that which exists in any conventional servodrive, and since the total energy involved in a typical duty cycle is not great, it may be dealt with by burning it off in a dump resistor disposed between the rails. As a rule of thumb, the dump resistor is usually sized to intermittently draw a current equal to the continuous rating of one axis in a DC drive (e.g. 20A or 40A). The first effect, i.e. that at zero speed, is not seen in DC servodrives with a single rail supply. One solution to the problem is to switch the reluctance motor phases at both top and bottom but this doubles the number of main devices.

A second technique to regenerate phase energy into the main supply is to use special bifilar windings in the motor. While this may seem attractive from many points of view there are also serious problems with this approach, as noted below, since the number of connections to the motor is doubled. In particular, to allow for worst case duties, the secondary winding would need to have virtually the same cross-section as the primary, thus greatly reducing the utilization of winding area and motor rating. In addition, in a bifilar winding, two closely coupled coils are connected to opposite supply rails and may have very high potential differences between them, leading to unreliable operation and breakdown. While appropriate for low voltage battery operation, this could cause serious problems with supplies over 100 V. Also as a main transistor switches off and a secondary winding takes over current conduction, very fast current rises and falls would take place in the leads to the winding. This, along with poor coupling between primary and secondary windings, could give rise to severe electromagnetic noise radiation. Bifilar windings may thus be seen to be appropriate only when the drive electronics are mounted close to the motor.

Since in virtually every application a servomotor requires to hold the friction torque of the mechanism it is driving when at stall, and stall current can be up to half the motor continuous rating, and since also in many applications, the motor will be holding an uncounterbalanced load, the provision of some effective and economical means of transferring energy away from a supply undergoing pump-up is regarded as a necessary feature of at least servomotor drives.

It may be argued that in large multiaxis systems, conditions at large should cancel out, so as to make the problem a relatively minor one. On the other hand, a solution to the unbalance problem must be available for implementation in systems where it is required. A very crude solution would be to have individual dump resistors on the rails to burn off the unbalance. However, since this might involve burning off the rated motor current continuously, it would hardly be acceptable.

BRIEF SUMMARY OF THE INVENTION

According to the invention, there is provided a power supply system for at least one inductive element, said system having first and second rails energizable at differing potentials, between which said element is switchingly connectible, and a third rail to which current flow to or from said element may be directed when the connection of said element between the first and second rails is broken, a further inductive element being switchingly connectible between said third rail and one of said first and second rails, and the system also comprising means for connecting said further element between said third rail and said one of the first and second rails when the voltage on the third rail is equal to or greater than a predetermined value and means for facilitating current flow between the further inductive element and the other of said first and second rails when the connection of said further element between the third rail and said one of the first and second rails is broken.

An inductive element is to be regarded as any component of the system having inductance as the primary parameter determining its electrical behaviour. Thus when the current flows through an inductive element as herein defined, it is inductance rather than resistance or any other measure of its electrical characteristics that determines its behaviour. The or each inductive element connectible between the first and second supply rails of the system may be a magnetizing or exciting winding of a variable reluctance motor.

In the power supply system according to the invention, a resistive element may also be switchingly connectible between said third rail and said one of the first and second rails, and the system may comprise means for connecting said resistive element between said third rail and said one of the first and second rails when the voltage between said third rail and said one of the first and second rails is equal to or greater than a predetermined value.

Current flowing from the or each inductive element connectible between the first and second rails of the system is preferably directed to the third rail by a diode, while the current flowing from the further inductive element may be similarly directed to said other of the first and second rails by a further diode. The inductance of said further inductive element is suitably selected to be substantially the same as that of the or each inductive element connectible between the first and second rails. The connection of each of the elements connectible between supply rails of the system most suitably takes place under the control of proportional-integral-differential type control means or systems in which an excess voltage represents an error signal, in dependence on the value of which, switches connecting the inductive element across the rails may be opened or closed as appropriate under PWM control.

In another aspect, the invention provides a power supply system having first and second rails energizable at differing potentials, between which an inductive element is switchingly connectible, and a third rail to which current flow to or from said inductive element may be directed when the connection of said element between the first and second rails is broken.

In a particular configuration of system according to this apsect of the invention, a dc (direct current) to dc converter may be provided comprising a system having first and second rails energizable at differing potentials between which an inductive element is switchingly connectible and a third rail to which current flowing from said inductive element may be directed when the connection of said element between the first and second rails is broken.

A dc voltage may be applied across the first and second rails and a dc load placed across the first and third rails. Opening and closing of the switch connecting the inductive element between the first and second rails results in a voltage being built up on the third rail, and the voltage across the dc load is represented by the difference between the respective voltages of the first rail and third rail relative to the second rail.

BRIEF DESCRIPTION OF THE DRAWINGS

Embodiments of the invention will now be described having regard to the accompanying drawings in which.

DETAILED DESCRIPTION OF THE DRAWINGS

Figure 1:
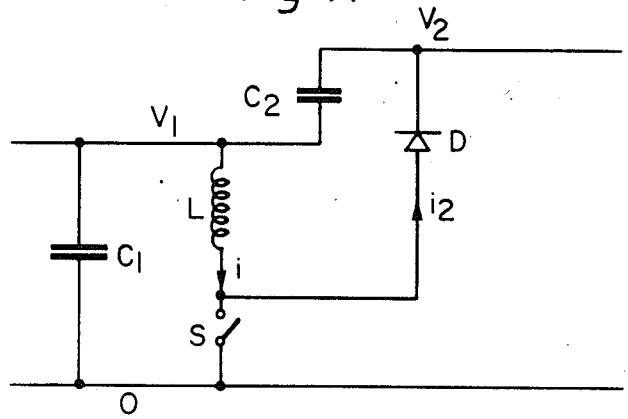
FIG. 1 is a schematic diagram of a unipolar drive for a switched variable reluctance motor.

As shown in FIG. 1, a phase winding L of a variable reluctance motor is connected between a first rail at a voltage $V_1$, and a second rail at earth O through a switch S. When the switch S is closed, a current indicated by i builds up through the inductor L. When the switch is opened again, the current will transfer to the diode D as $i_2$. If the rail to which this current flows through the diode D is unable to regenerate the returned energy, the voltage on the capacitor $C_2$ between the first and third rails will rise, with possibly destructive results, if no precautionary action is taken.

Figure 2:
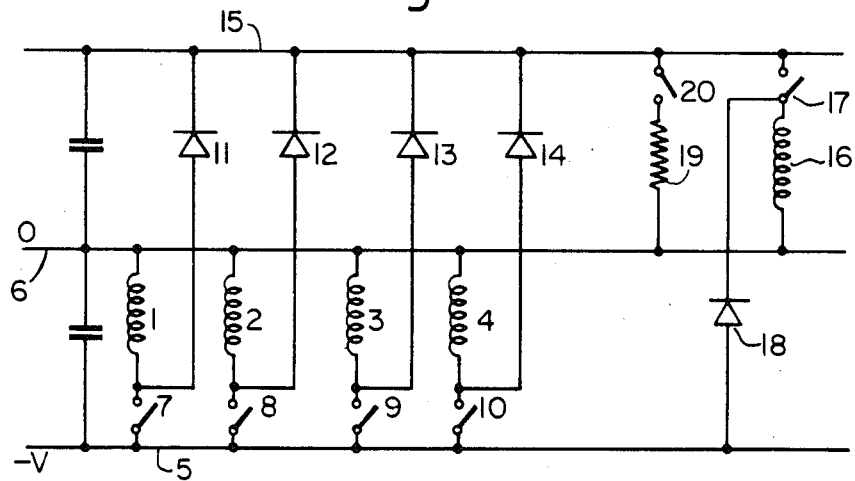
FIG. 2 is a schematic diagram of a power supply system according to the present invention.

As shown in FIG. 2, the four phase windings 1, 2, 3 and 4 of a four-phase reluctance motor are fed from a single-ended power supply consisting of a negative rail 5 and a ground rail 6, through respective switches 7, 8, 9 and 10. In order to dispose of the inductive energy stored in the phase windings, which behave as inductive elements as herein defined to return enegry to the power supply system on phase switch-off, diodes 11, 12, 13 and 14 direct the returned energy to an upper rail 15, which is not tied to any voltage and serves merely as a means for recirculating and disposing of returned energy. A dummy phase winding 16 in the form of an inductive coil of substantially the same value of inductance as each of the phase windings 1 to 4 bridges between the upper floating rail 15 and the ground rail 6. The floating rail is connected through the dummy winding 16 to the ground rail by a switch 17, similar to the switches 7 to 10 of the main motor phase windings. In order to take away returned inductive energy from the element 16 when the switch 17 is opened, a diode 18 is connected between the inductive element 16 and the negative rail for the same direction of current flow as the diodes associated with the phase windings proper. A dump resistor 19 between the floating rail and the ground rail is switched in or out by switch 20 and serves for disposal of returned energy during regeneration, when all motor phases are active.

The system incorporating the features of the invention as described above recirculates any unbalanced transfer of energy from the negative rail during unbalanced operating conditions, such as may prevail when a servomotor is at standstill, so that pump-up or excessive build-up of voltage on that rail may be avoided. A logic circuit associated with the power system detects the build-up of voltage and functions to operate switch 17 at appropriate intervals so that it recirculates such energy in a manner complementary to the way in which the active phase winding or windings remove it from the negative rail, and normal voltage conditions may thereby be maintained in the power supply system. This detection circuit will normally be a proportional/integal/differential type control system with excess auxiliary power supply voltage as its error signal. The dump resistor 19 will be activated by switch 20 when operation of the anti-pump-up circuit as described above causes the main power supply to build up excess voltage. In one implementation, excess main rail voltage inhibits the operation of the dummy winding 16 and the dump circuit is activated when the auxiliary rail voltage passes a present threshold.

Figure 3:
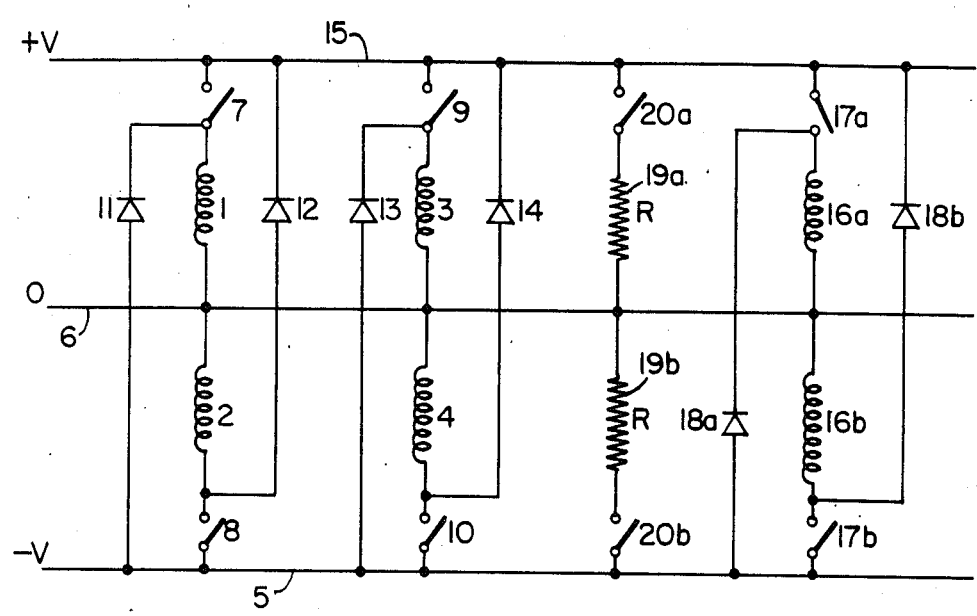
FIG. 3 is a schematic diagram of a further configuration of power supply system according to the present invention.

In the three-rail system of FIG. 3, a substantially similar arrangement is provided but the upper rail 15 is in this instance a positive rail at $+V$. Two dummy windings 16a and 16b are then necessary to link between the positive 15 and negative 5 rails respectively and the ground rail 6, since in this instance the negative rail 5 is also subject to being pumped-up by the positive rail 15. Similarly, each dummy winding has an associated switch 17a, 17b and a diode 18a and 18b respectively. Two dump resistors 19a and 19b are also provided for disposal of energy during regeneration, and are switched by respective switches 20a, 20b.

Operation of this system is essentially similar to that of the first arrangement, the appropriate dummy winding being switched depending on which of the rails is being "pumped-up" under standstill or unbalanced conditions of phase winding energization. The scheme of FIG. 3 substantially equates to a back-to-back positioning of two circuits as illustrated in FIG. 2.

Referring again to FIG. 1, it will be seen that the action of the circuit shown is one of transferring energy from a supply rail at a potential $V_1$ to a supply rail at a potential $V_2$, using only a single inductive element, a switch and a diode. Energy may be drawn from capacitor $C_2$ at a potential of $V_2 - V_1$. This circuit forms the basis of a dc to dc converter of an advantageous nature. The magnitude of the voltage $V_2$ is controlled by the on-time and switching frequency of switch S. The longer the switch is closed, the higher the current that builds up in the inductor and the greater the energy transfer to the second rail. Similarly, the more frequently the switch is closed, the greater the energy transfer. Thus the switch may operate in a PWM mode, with the on-off time varying, or a chopper may be used in which the on-time is fixed but the frequency of switching is varied. For a changing load on the second rail, a feedback loop controlling one of the variables of the system may be needed to stabilize the voltage.

Figure 4:
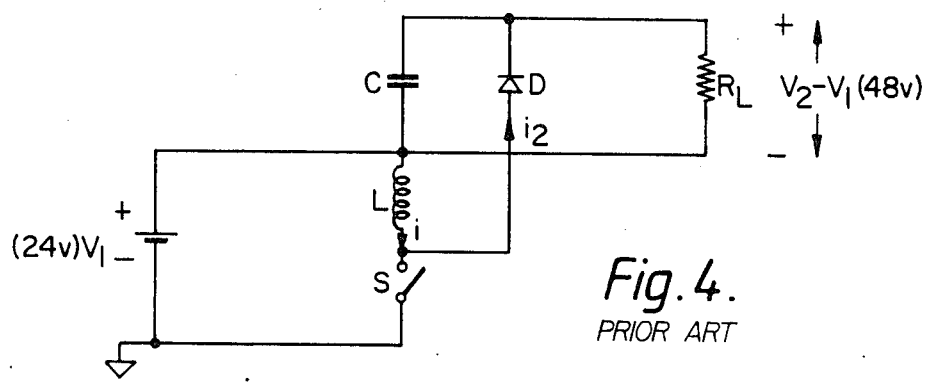
FIGS. 4 and 5 show respectively, two embodiments of prior art dc converters.
Figure 5:
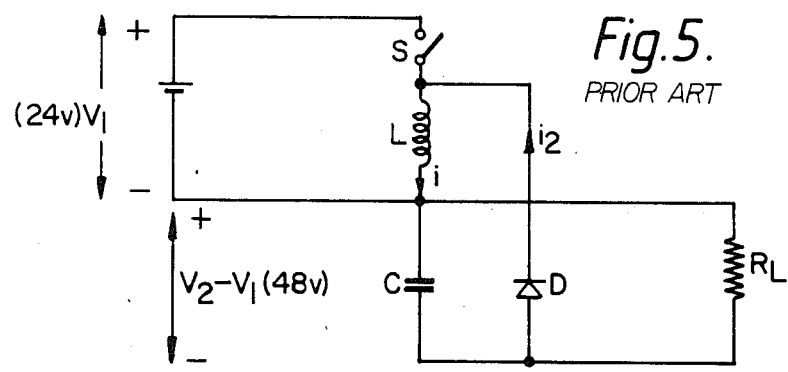

Two examples are illustrated in FIGS. 4 and 5. In each case a 24 v battery supply $V_1$ is stepped up to drive a 48 v ($V_2 - V_1$) load. The configuration of FIG. 4 gives a positive output voltage, while that of FIG. 5 gives a negative output voltage.

Figure 6:
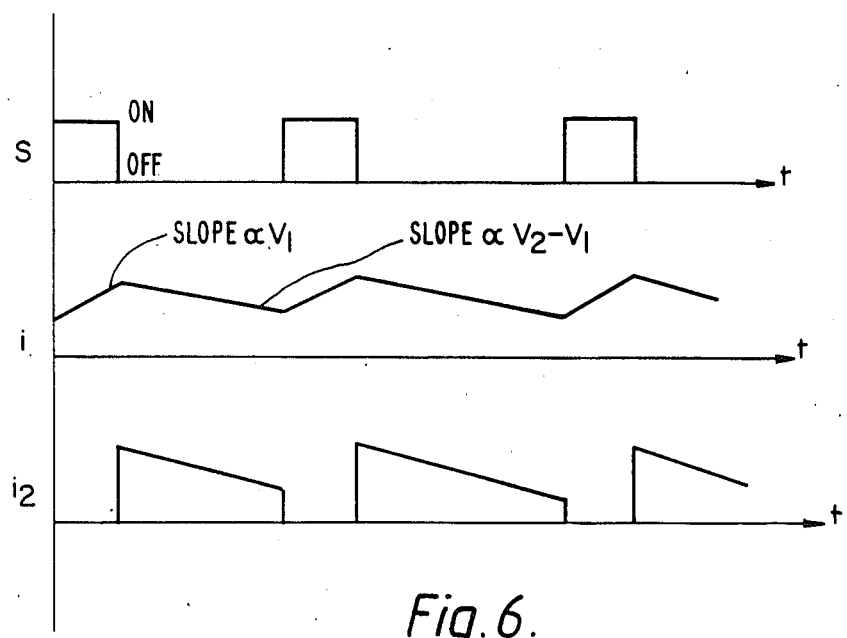
FIGS. 6 and 7 show in schematic and comparative form only, the operation of converters according to FIGS. 4 or 5 under alternative regimes.
Figure 7:
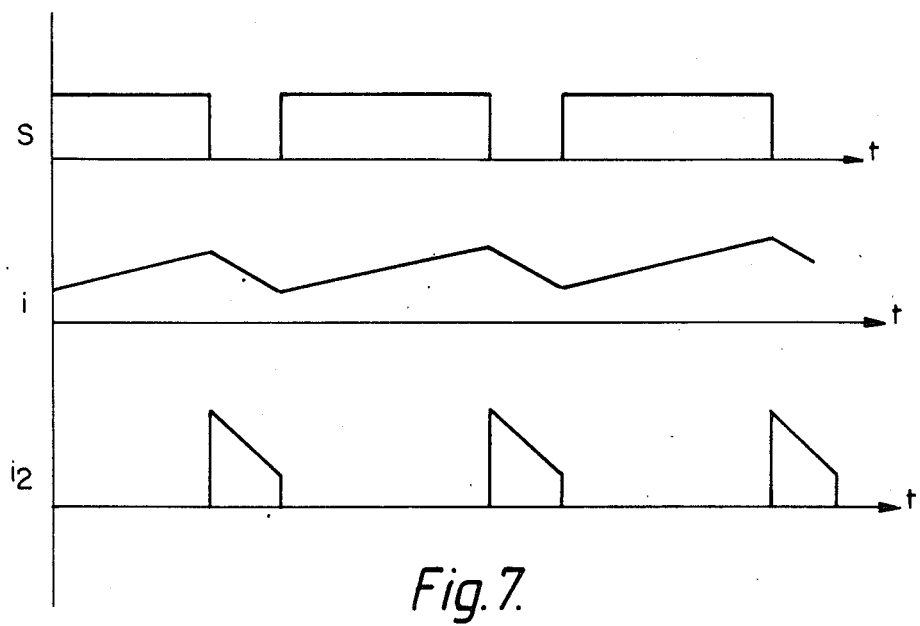

FIGS. 6 and 7 show the inter-relationship between the switching frequency and its duration and the currents i and $i_2$ of FIGS. 4 and 5 for a small $V_2 - V_1$ (FIG. 6) and for a larger value of this voltage (FIG. 7). The diagrams are schematic and comparative only and are not intended to indicate any specific values of current or time.

Figure 8:
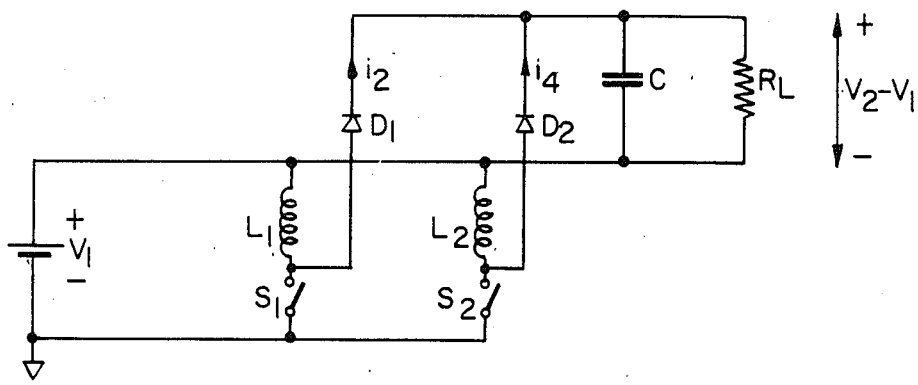
FIG. 8 shows a system including two inductive elements.

Two or more inductive elements may be combined in a power supply system or converter in order to increase the power rating. An arrangement having two inductors is shown in FIG. 8. In such a circuit, the switching of $S_1$ and $S_2$ may be staggered to improve the uniformity of the combined current $i_2 + i_4$.

Electrical isolation between input and output is a frequent requirement for dc to dc converters. This may be achieved in the arrangement shown in FIG. 9, in which each inductor L is replaced by an element or device wound with two separate but closely coupled coils, designated $L_{11}$, $L_{12}$, $L_{21}$, $L_{22}$ and $L_{31}$, $L_{32}$ in the three phase circuit of FIG. 9. These devices are to be distinguished from transformers, in that they may include an airgap in the magnetic circuit to provide a relatively low and well-defined inductance, or alternatively, that they achieve this latter result by any other appropriate means.

Figure 10:
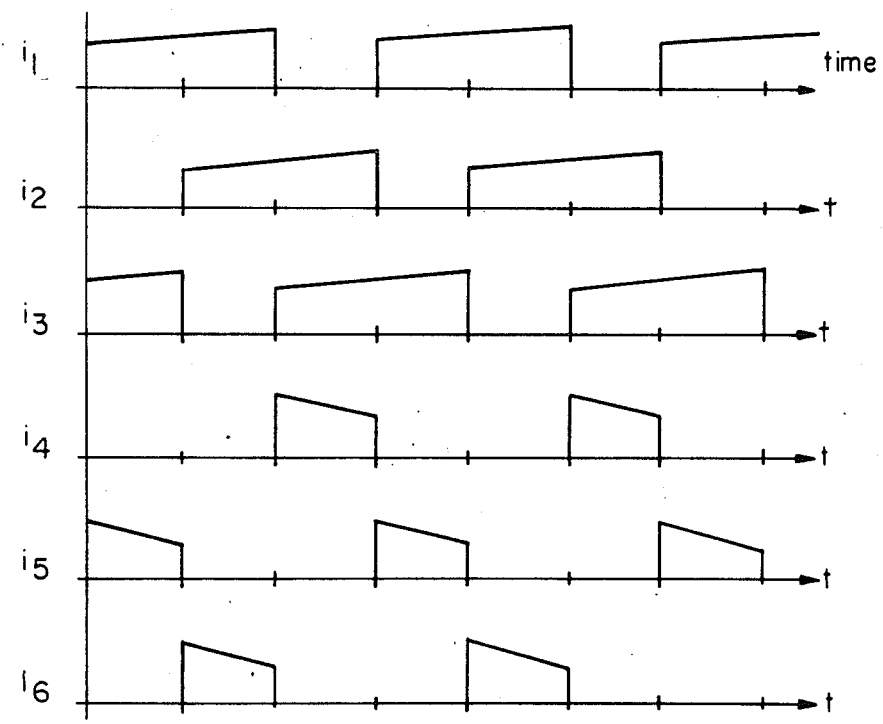
FIG. 10 shows typical waveforms for the system of FIG. 9 under full load conditions.
Figure 9:
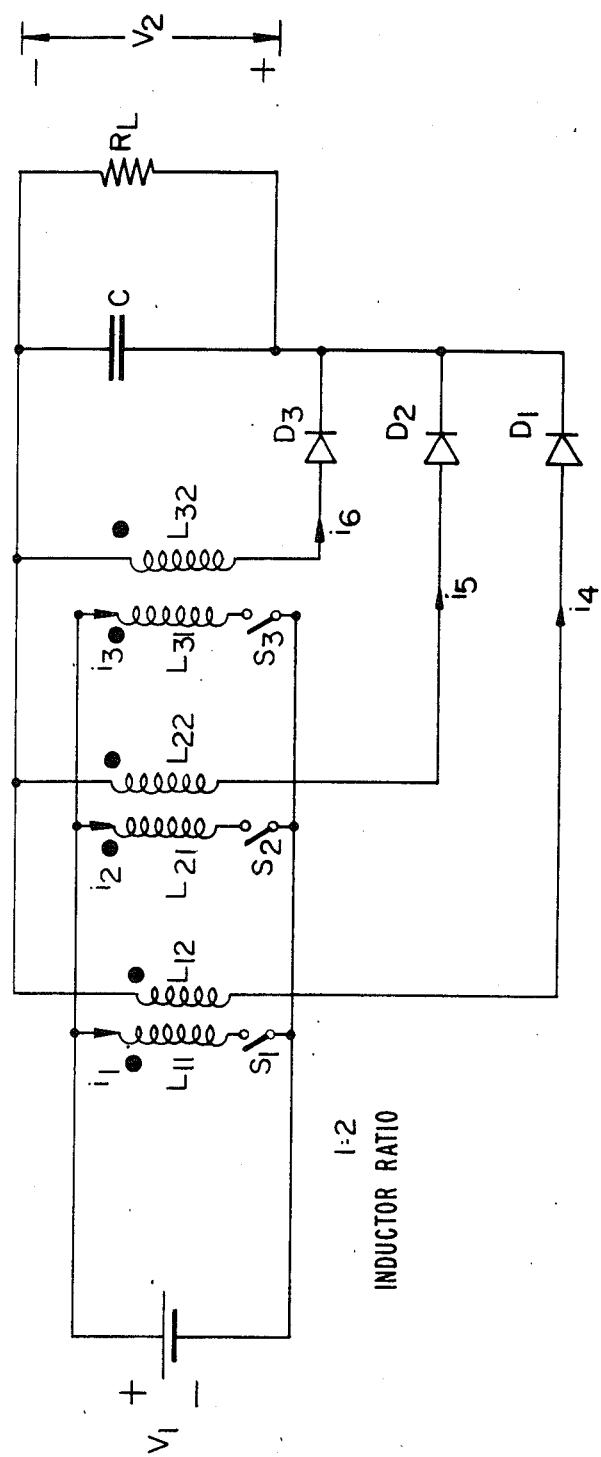
FIG. 9 shows a converter according to the invention providing for isolation between input and output.

Typical waveforms for the three-phase circuit of FIG. 9 are depicted in FIG. 10, for full load conditions in the case where the inductor windings have a 1:2 turns ratio. Suitable waveforms for conditions other than full load are achieved by controlling the ON time of the switches in a chopping or PWM mode.

Thus according to a further aspect of the invention, the power supply system includes a plurality of said inductive elements connectible between said first and third rails and the or each said inductive element has first and second coils, said first coil being connectible between said first and second rails and being isolated from said second coil, and said current flowing from said second coil when said connection is broken.

We claim:

1. A power supply system having first, second and third rails, said first and second rails being energizable at differing potentials, and a plurality of inductive elements, each said inductive element having first and second coils, each said first coil being switchingly connectible between said first and second rails and being isolated from the respective said second coil, and the system including means for current flow between each said second coil and said third rail when the connection of the respective said first coil between the first and second rails is broken.

2. A power supply system according to claim 1, wherein each said inductive element has an airgap in the magnetic circuit to provide a relatively low and well-defined magnetic inductance.

3. A power supply for a plurality of inductive elements, said system having first, second and third rails, said first and second rails being energizable at differing potentials and each said element being switchingly connectible between the rails, and the system including means for current flow between each said element and said third rail when the connection of said element between the first and second rails is broken, a further inductive element of substantially the same value of inductance as each of said plurality of inductive elements being switchingly connectible between said third rail and one of said first and second rails, and the system also comprising means for connecting said further element between said third rail and said one of the first and second rails when the voltage on the third rail is equal to or greater than a predetermined value and means for current flow between the further inductive element and the other of said first and second rails when the connection of said further element between the third rail and said one of the first and second rails is broken.

4. A power supply system according to claim 3, wherein a resistive element is also switchingly connectible between said third rail and said one of the first and second rails, and the system comprises means for connecting said resistive element between said third rail and said one of the first and second rails when the voltage between said third rail and said one of the first and second rails is equal to or greater than a predetermined value.

* * * * *